(12) United States Patent
Yamazaki

(10) Patent No.: US 8,054,728 B2
(45) Date of Patent: Nov. 8, 2011

(54) MULTILAYER OPTICAL DISK, MULTILAYER OPTICAL DISK RECORDING APPARATUS AND MULTILAYER OPTICAL DISK REPRODUCING APPARATUS

(75) Inventor: Shigeru Yamazaki, Yokohama (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 188 days.

(21) Appl. No.: 12/431,866

(22) Filed: Apr. 29, 2009

(65) Prior Publication Data
US 2009/0316555 A1 Dec. 24, 2009

(30) Foreign Application Priority Data
Jun. 20, 2008 (JP) .................................. 2008-161127

(51) Int. Cl.
*G11B 3/74* (2006.01)
(52) U.S. Cl. ..................................... 369/94; 369/124.03
(58) Field of Classification Search .......................... None
See application file for complete search history.

(56) References Cited

U.S. PATENT DOCUMENTS

| | | | | |
|---|---|---|---|---|
| 5,526,338 A * | 6/1996 | Hasman et al. | .................. | 369/94 |
| 5,838,653 A * | 11/1998 | Fan et al. | ..................... | 369/275.1 |
| 5,881,032 A | 3/1999 | Ito et al. | | |
| 6,511,788 B1 | 1/2003 | Yasuda et al. | | |
| 7,075,870 B2 * | 7/2006 | Akiyama et al. | ............ | 369/47.51 |
| 2007/0070843 A1 | 3/2007 | Kobayashi | | |
| 2007/0109920 A1 | 5/2007 | Chang et al. | | |
| 2008/0130426 A1 | 6/2008 | Kwon | | |

FOREIGN PATENT DOCUMENTS

| | | |
|---|---|---|
| CN | 1268743 A | 4/2000 |
| JP | 02-301020 A | 12/1990 |
| JP | 2003-051129 A | 2/2003 |
| JP | 2006-164374 | 6/2006 |
| JP | 2006-268952 A | 10/2006 |
| JP | 2008-204518 A | 9/2008 |
| WO | WO2008/111592 A1 | 9/2008 |

OTHER PUBLICATIONS

Extended European Search Report for European patent application EP09251206 (Oct. 12, 2009).
China State Intellectual Property Office (SIPO) office action for SIPO patent application CN200910130763.7 (Jul. 13, 2011).

* cited by examiner

*Primary Examiner* — Paul Huber
(74) *Attorney, Agent, or Firm* — Kilpatrick Townsend & Stockton LLP

(57) ABSTRACT

A multilayer optical disk apparatus comprises an optical pickup that emits N (N represents an integer of two or more) laser beams of the same wavelength. The optical pickup emits the N laser beams at the same time, focuses the N laser beams on a first recording layer group alternately configured by N recording layers of the multilayer optical disk and performs a recording operation on the N recording layers at the same time. When changing the recording layers the optical pickup focuses the N laser beams on a second recording layer group configured by recording layers adjacent to the respective recording layers configuring the first recording layer group and performs a recording operation on the N recording layers at the same time.

13 Claims, 7 Drawing Sheets

FIG.2
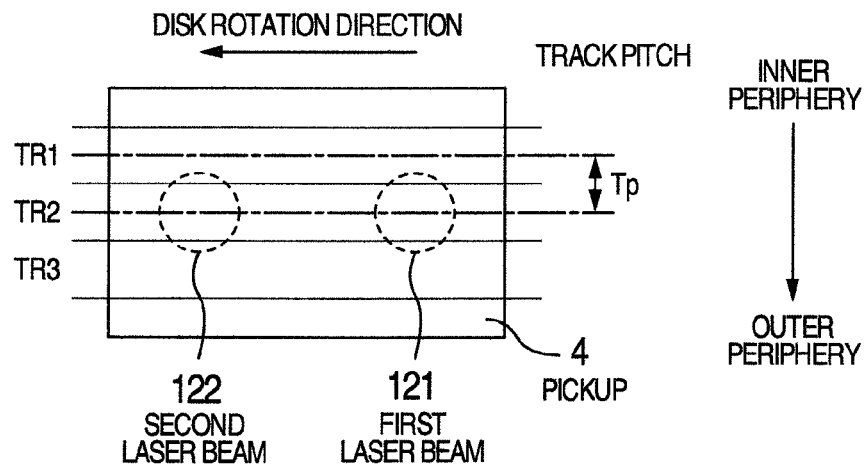
FIG.3
| | | ADDRESS INCREASING DIRECTION | |
| --- | --- | --- | --- |
| | | INNER PERIPHERY | OUTER PERIPHERY |
| RECORDING LAYER L0 | 110 | 0100000h → | 0CA73FFh |
| RECORDING LAYER L1 | 111 | 1EFFFFFh ← | 1358C00h |
| RECORDING LAYER L2 | 112 | 2100000h → | 2CA73FFh |
| RECORDING LAYER L3 | 113 | 3EFFFFFh ← | 3358C00h |
| RECORDING LAYER L4 | 114 | 4100000h → | 4CA73FFh |
| RECORDING LAYER L5 | 115 | 5EFFFFFh ← | 5358C00h |
FIG.4
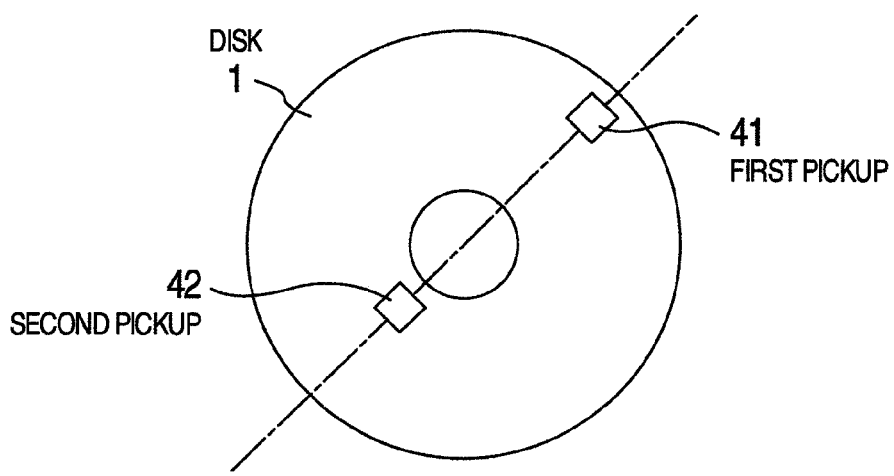

MULTILAYER OPTICAL DISK, MULTILAYER OPTICAL DISK RECORDING APPARATUS AND MULTILAYER OPTICAL DISK REPRODUCING APPARATUS

INCORPORATION BY REFERENCE

The present application claims priority from Japanese application JP-2008-161127 filed on Jun. 20, 2008 the content of which is hereby incorporated by reference into this application.

BACKGROUND OF THE INVENTION

The present invention relates to an optical disk recording apparatus and optical disk reproducing apparatus and, more particularly, to a multilayer optical disk recording apparatus and multilayer optical disk reproducing apparatus capable of high-speed recording of a multilayer optical disk.

For a technology of the speeding up related to the present invention, for example, disclosed in JP-A-2006-164374. JP-A-2006-164374 discloses a method for irradiating two laser beams on a plurality of recording layers within a disk via one objective lens at the same time.

SUMMARY OF THE INVENTION

In the market for optical disk media represented by DVD, increase in density is in progress to adapt to a large capacity of recording information. Blu-ray Disk and HD-DVD, for which blue laser is used as a light source, are recently commercialized. And a recording capacity of 25 GB on one side is realized using Blu-ray disk technology. Further, a recording operation of a multilayer medium is enabled due to the increase in output power of blue laser. For example, information data of 50 GB can be recorded on one side using a dual-layer disk of Blu-ray Disk system. Development to this large recording capacity is predicted to be promoted in the future with a central focus on the development of a multi-layering technology.

As described above, the storage capacity of one optical disk largely increases with the adoption of blue laser. Accordingly, the processing time required to be recorded and reproduced also increases as much as an increased storage capacity. At the present, the high-speed recording and reproducing technological development such as sixfold speed is being promoted along with a larger capacity of the optical disk. A current system configuration is considered to have a limit of about twelvefold speed from the limitations of the disk rotation number.

For this high-speed technology, disclosed is a multilayer simultaneous recording technology in JP-A-2006-164374. The management of recording areas is important in the system wherein this multi-recording layer simultaneous recording format and a conventional single-layer recording format mixedly exist.

In view of the foregoing, it is an object of the present invention to provide a multilayer optical disk recording apparatus and multilayer optical disk reproducing apparatus capable of performing a stable high-speed recording operation under a simple control.

The above-described object is accomplished as one example according to the present invention described in the scope of the patent claims. A summary of typical one of the inventions disclosed in the application will be briefly described as follows.

To accomplish the above-described object, according to the present invention, there is provided a multilayer optical disk recording apparatus for recording information on a multilayer optical disk having a plurality of recording layers in a thick direction, comprising an optical pickup that emits N (N represents an integer of two or more) laser beams of the same wavelength, the apparatus causing the optical pickup:
to emit the N laser beams at the same time,
to focus the N laser beams on a first recording layer group alternately configured by N recording layers of the multilayer optical disk, and
to perform a recording operation on the N recording layers at the same time; and
when changing the recording layers,
to focus the N laser beams on a second recording layer group configured by recording layers adjacent to the respective recording layers configuring the first recording layer group, and
to perform a recording operation on the N recording layers at the same time.

According to the present invention, the recording speed onto a multilayer optical disk can be stably made high under a simple control.

BRIEF DESCRIPTION OF THE DRAWINGS

FIG. 2 is a schematic diagram of a position relation between a laser beam and a recording track according to the present invention;

FIG. 3 illustrates one example of a physical address of a multilayer optical disk according to the present invention;

FIG. 4 is a block diagram of a multilayer optical disk recording and reproducing apparatus according to the present invention;

DETAILED DESCRIPTION OF THE INVENTION

Hereinafter, preferred embodiments of the present invention will be described with reference to the accompanying drawings.

First Embodiment

Figure 1:
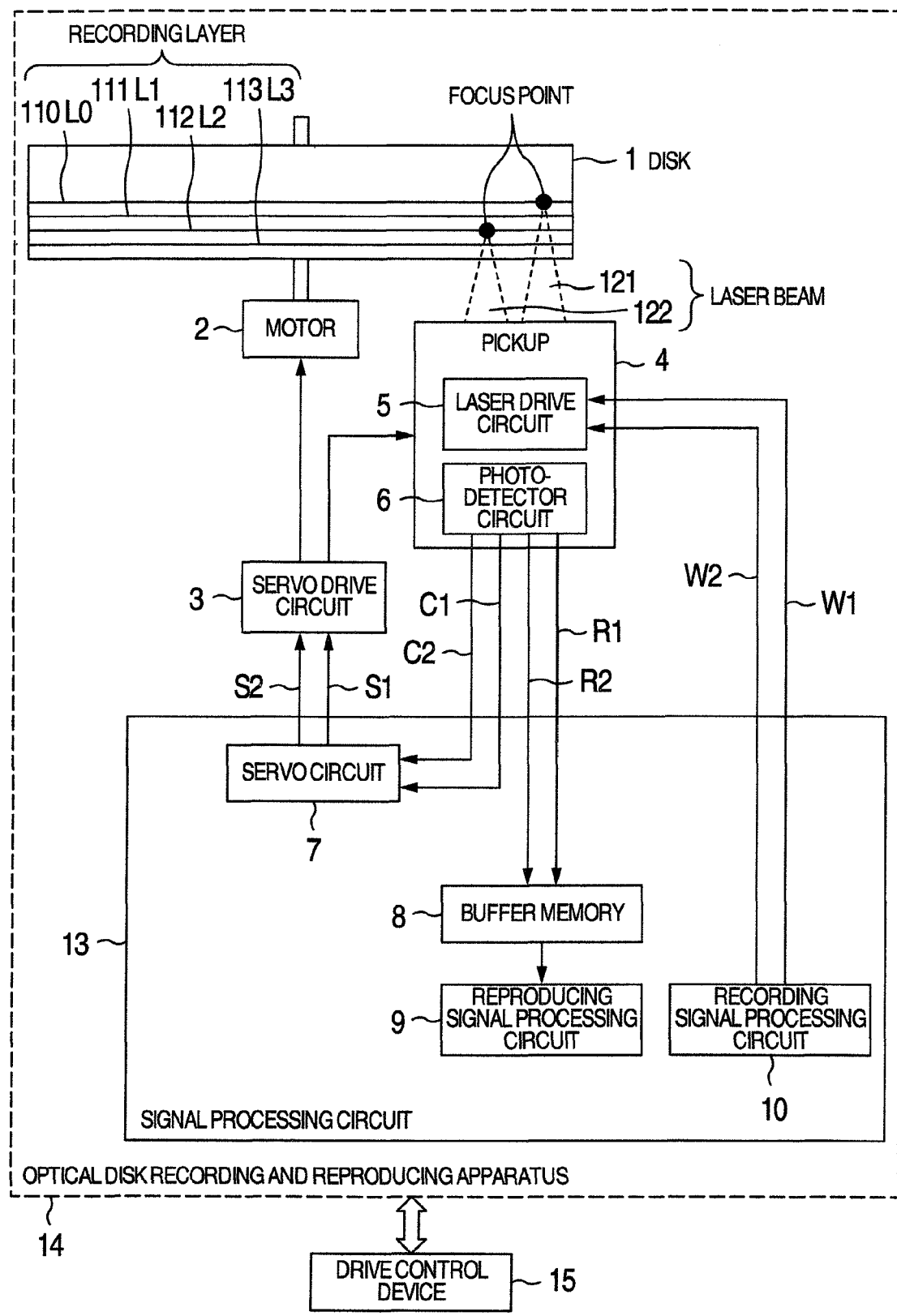
FIG. 1 is a block diagram of a multilayer optical disk recording and reproducing apparatus according to the present invention.

FIG. 1 is a block diagram illustrating one embodiment of a multilayer optical disk recording and reproducing apparatus according to the present invention. Reference numeral 1 denotes a disk, 2 denotes a motor, 3 denotes a servo drive circuit, 4 denotes a pickup, 5 denotes a laser drive circuit, 6 denotes a photodetector circuit, 7 denotes a servo circuit, 8 denotes a buffer memory, 9 denotes a reproducing signal processing circuit, 10 denotes a recording signal processing circuit, 110 denotes an L0 recording layer, 111 denotes an L1 recording layer, 112 denotes an L2 recording layer, 113 denotes an L3 recording layer, 121 denotes a first laser beam, 122 denotes a second laser beam, 13 denotes a signal processing circuit, 14 denotes an optical disk recording and reproducing apparatus, and 15 denotes a drive control device.

According to the present embodiment of FIG. 1, a 4-layer disk is used as the disk 1, and the first laser beam 121 and the second laser beam 122 are emitted so as to correspond to a dual-layer simultaneous recording operation.

At first, basic operations of the optical disk recording and reproducing apparatus 14 will be described. Only the first laser beam 121 is normally irradiated from the pickup 4. When a BD-R disk 1 as a one-time writing disk in a Blu-Ray system is inserted into the optical disk recording and reproducing apparatus 14, the disk 1 is rotated by the motor 2, the servo circuit 7 and the servo drive circuit 3, and the first laser beam 121 that is controlled to a power value for reproduction is irradiated on a recording surface of the disk 1 from the pickup 4. The photodetector circuit 6 detects the intensity of light reflected by the disk 1 of the first laser beam 121 to thereby obtain reproducing digital signal trains. Next, the reproducing digital signal trains are decoded using the buffer memory 8 and the reproducing signal processing circuit 9, and information of the control signals recorded on the disk 1 is read out, thereby discriminating a disk medium. When the disk 1 here inserted is determined to be a BD-R, the optical disk recording and reproducing apparatus 14 is in an operation standby state. Thereafter, the optical disk recording and reproducing apparatus 14 is controlled in a recording or reproducing state of data, for example, based on instructions of the drive control device 15 configured by a host computer.

During the recording operation, under the control of the servo circuit 7, the servo drive circuit 3 rotates the disk 1 at a predetermined speed, and at the same time, performs processings such as a focus control, tracking control, and optimum recording power control of the first laser beam 121. Next, digital data strings W1 outputted from the recording signal processing circuit 10 within the signal processing circuit 13 are transmitted to the laser drive circuit 5. Further, the laser drive circuit 5 sets a power value of a recording data signal to a predetermined value, and sequentially records information data on a track of the disk 1.

Also during the reproducing operation, in the same manner, the servo drive circuit 3 rotates the disk 1 at a predetermined speed, and at the same time, performs processings such as a focus control and tracking control of the first laser beam 121, whereby recorded reproduction digital data strings R1 are sequentially reproduced.

Speeding-up of the operations of the optical disk recording and reproducing apparatus 14 having the above-described configuration will be described.

To realize a reproduction speed of sixfold speed at the outer peripheral surface, for example, by a constant angular velocity (CAV) system, the number of rotations of the motor 2 is controlled to 4860 rotations per minute using the servo drive circuit 3. Next, the photodetector circuit 6 detects reflected light of the first laser beam 121 outputted from the pickup 4. Further, the photodetector circuit 6 scans one recording track that is spirally formed from an inner periphery to outer periphery of the disk 1, and obtains the reproduction digital data strings R1. At this time, the reproduction speed at the outer peripheral portion of the disk 1 is the fastest sixfold speed, and the signal frequency to be reproduced is a repeating signal with 2T (T is a bit period) of 99 MHz. Meanwhile, the reproduction speed at the inner peripheral portion of the disk 1, since the number of rotations of the motor 2 is 4860 rotations per minute, is a two and half-fold speed.

In the CAV system, the number of a maximum double speed is thus determined by the number of rotations of the disk 1. For example, when the allowable number of rotations of the motor 2 is determined to be 10000 rotations or less per minute (9720 rotations per minute), the number of the maximum double speed is fivefold speed at the inner peripheral surface, and is twelvefold speed at the outer peripheral surface, respectively.

Next, an operation of the signal processing circuit 13 will be described. At first, the data is reproduced by the operations of a PLL circuit that detects a transmission clock from among the reproduction digital signal trains R1 as well as by those of a partial response reproducing circuit that adapts a transmission system to a partial response. Thereafter, the reproduced data is once stored in the buffer memory 8. The data stored in the buffer memory 8 is sequentially read out by the reproducing signal processing circuit 9, and the information data recorded on the disk 1 is reproduced using circuit operations (not shown) of a synchronization signal detection circuit, a demodulation circuit, and an error detecting and correcting circuit. The speed equivalent to twelvefold speed can be realized by the adoption of a micromachining process in relation to the operation speed of the above-described circuits.

In the general optical disk recording and reproducing apparatus 14, a number of signals such as RF signals or servo signals as signals outputted from the photodetector circuit 6 within the pickup 4 are here required to be transmitted to the circuit board. Further, due to the signal transmission between a moving part and a fixed part, the pickup 4 and the circuit board are connected to each other, in many cases, by a conductor wiring printed on a flexible sheet. The wiring using this flexible sheet is suitable for the above-described connection between the moving part and the fixed part; however, has a fault that when a wiring interval is narrowed, capacitance between wirings increases, and further, this capacitance between wirings is resonated with the inductance of transmission line to thereby narrow the transmission band width. The transmission band width is on the order of 150 MHz depending on the design (wiring length, wiring width, and wiring interval) of the flexible sheet. This transmission band width is equal to the frequency spectrum distribution band width in the sixfold speed using the above-described Blu-Ray system, and therefore, the transfer speed of an eightfold speed or more is hard to be realized using a conventional apparatus configuration. Accordingly, based on frequency characteristics of this transmission circuit, the sixfold speed is the reproduction speed that can be realized with stable operations in a conventional system configuration.

As compared with one beam system described above, the following method as shown in FIG. 1 is used in the present invention. That is, during the recording and reproducing operations, the first laser beam 121 and the second laser beam 122 are emitted, and both of the operations are performed on two recording layers at the same time, thereby realizing a speeding up being twice as fast as the conventional speed.

FIG. 2 illustrates an example of an arrangement of two laser beams according to the present invention. In FIG. 2, the first laser beam 121 and the second laser beam 122 are formed in line in a recording track direction of the disk 1.

The drive control device 15 shown in FIG. 1, when commanding a dual-layer simultaneous recording mode, causes the recording signal processing circuit 10 to operate at a speed being twice as fast as the conventional speed as well as to output two recording signal data strings W1 and W2 at the same time, and causes the optical pickup 4 to emit the first laser beam 121 and the second laser beam 122, respectively. Each of the recording signal data strings W1 and W2 at this time has the same data transmission speed as that at the time of a conventional single layer recording operation. In the present embodiment, the servo drive circuit 3 performs a focus control such that the first laser beam 121 focuses on the L0 recording layer 110 and the second laser beam 122 focuses on the L2 recording layer 112.

Next, from the inner peripheral surface to the outer peripheral surface of the disk 1, the first laser beam 121 sequentially records information data on a recording track of the L0 recording layer 110 and the second laser beam 122 records information data on a recording track of the L2 recording layer 112. When the recording operation is finished up to the outermost peripheral surface of the disk 1, each laser beam performs an interlayer jump as much as one recording layer and performs a focus adjustment. From the outer peripheral surface to the inner peripheral surface, at this time, the first laser beam 121 records the information data on the recording track of the L1 recording layer 111 and the second laser beam 122 records the information data on the recording track of the L3 recording layer 113.

FIG. 3 illustrates one example of a physical address of the multilayer optical disk used in the present embodiment.

In FIG. 3, the disk 1 has 6 recording layers, and the physical address is configured so as to increase in the order corresponding to the L0 recording layer inner periphery, the L0 recording layer outer periphery, the L1 recording layer outer periphery, the L1 recording layer inner periphery, the L2 recording layer inner periphery, the L2 recording layer outer periphery, the L3 recording layer outer periphery, the L3 recording layer inner periphery, the L4 recording layer inner periphery, the L4 recording layer outer periphery, the L5 recording layer outer periphery, and the L5 recording layer inner periphery. The layer number is imparted to a high-order position of each address, and further, the same physical address is imparted to the same radius position of the L0 recording layer 110, the L2 recording layer 112, and the L4 recording layer 114 as well as that of the L1 recording layer 111, the L3 recording layer 113, and the L5 recording layer 115. As one example, the layer number is here imparted to the high-order position of each address; however, the present embodiment is not limited thereto.

The present invention exerts the following effects. At first, when the information data is recorded on a multilayer disk to which the physical address is thus imparted, the dual-layer simultaneous recording operation is performed alternately in the same radius position as described above. Thereby, since only the layer number is different from each other and the recording operation can be performed on each recording layer by the same physical address, this facilitates management of the physical address. Secondly, when the recording layer is moved at the time when a recordable region of each recording layer disappears, the interlayer jump is required to be performed as much as two recording layers in the case of performing the simultaneous recording operation in adjacent recording layers. However, in the method for alternately performing the simultaneous recording operation according to the present invention shown in FIG. 1, since each laser beam may perform the interlayer jump as much as one recording layer, a stable and rapid movement can be performed.

In order that the recording physical addresses between both the recording layers may be here allowed to correspond to each other in the case of using an arrangement of the laser beam shown in FIG. 2, the data transmission to the second laser beam 122 may be delayed as compared with that to the first laser beam 121 as much as a distance between two laser beams. In the same manner, also during the reproducing operation, in order to obtain the reproduction data with the same physical address, the data transmission to the second laser beam 122 may be delayed as compared with that to the first laser beam 121.

During the reproducing operation in FIG. 1, the first laser beam 121 and the second laser beam 122 are each set to reproducing laser power. By using the same servo process as that during the recording operation, the first laser beam 121 irradiates the L0 recording layer 110, and meanwhile, the second laser beam 122 irradiates the L2 recording layer 112 for the simultaneous reproduction, thereby obtaining the reproduction signal trains R1 and R2. Next, when the reproducing operation is finished up to the outermost peripheral surface, each laser beam performs the interlayer jump as much as one recording layer and performs the focus adjustment. Thereafter, at this time, the first laser beam 121 irradiates a recording track of the L1 recording layer 111, and meanwhile, the second laser beam 122 irradiates a recording track of the L3 recording layer 113 for the simultaneous reproduction from the outer peripheral surface to the inner peripheral surface.

As described above, in the dual-layer simultaneous recording operation according to the present invention, since a series of information data blocks is divided into two data strings W1 and W2 to be recorded, two data strings R1 and R2 are reproduced at the same time to be sequentially stored in the buffer memory 8 in parallel during the reproducing operation. During the reading operation, the data address number is detected based on data ID codes of the data to be rearranged to the original series data strings based on these signals.

After the determination of the data order, the signal processing circuit 13 performs a double speed operation. Specifically, after reading out the buffer memory 8, the signal processing circuit 13 causes a synchronization signal detection circuit, a demodulator circuit, and an error detecting and correcting circuit to operate, for example, at the twelvefold speed mode (basic transmission clock frequency: 792 MHz). By using the above-described configuration, an analog signal operating area may be a transmission band width equivalent to the sixfold speed, and the data reproduction of the twelvefold speed can be performed also using the signal transmission by the conventionally-used flexible sheet. Further, the operation clock frequencies of the signal processing circuit 13 can be reduced by performing a part of the processings in parallel. The reproduction of the recorded data can be reduced to half of a conventional time through this dual-layer simultaneous reproducing operation.

In the multilayer disk here used in the present invention, an eccentricity amount is expected to be different from each other at each recording layer in the process of manufacture. However, the focus control and tracking control of the first laser beam 121 and the second laser beam 122 are each controlled independently by the servo control signals C1 and C2 of the photodetector circuit 6 as well as by the output signals S1 and S2 of the servo circuit 7. Therefore, the focus control and tracking control can be easily adjusted using a conventional method and are not required to be intricately adjusted.

When a data recording error occurs during the recording operation, the recording retry process is performed in the same manner as in the conventional apparatus. When the error still cannot be corrected, the defect management is performed. At this time, both of the recording retry process and the defect management are performed to adjust only the relevant recording layer, and the other laser beam is set to a reproduction mode such that the recording operation is not performed. In this connection, the same information data as the change information is recorded in the disk management area formed in the recording layer during the simultaneous recording operation.

In FIG. 2, an example where the first laser beam 121 is arranged on the L0 recording layer 110, and the second laser beam 122 is arranged on the L2 recording layer 112 is described. Further, when managing even the recording timing, the first laser beam 121 may be arranged on the L2 recording layer 112, and the second laser beam 122 may be arranged on the L0 recording layer 110.

The physical address shown in FIG. 3 is started as a starting point from the inner peripheral portion of the L0 recording layer; however, there is no problem even if the physical address is started as a starting point from the outer peripheral portion of the L0 recording layer. The physical address at this time is configured so as to increase in the order corresponding to the L0 recording layer outer periphery, the L0 recording layer inner periphery, the L1 recording layer inner periphery, the L1 recording layer outer periphery, the L2 recording layer outer periphery, the L2 recording layer inner periphery, the L3 recording layer inner periphery, the L3 recording layer outer periphery, the L4 recording layer outer periphery, the L4 recording layer inner periphery, the L5 recording layer inner periphery, and the L5 recording layer outer periphery. In FIG. 3, a deepest layer of the disk 1 is defined as the L0 recording layer; however, a surface layer of the disk 1 may be defined as the L0 recording layer and the deepest layer may be defined as the L5 recording layer.

When the information data is thus recorded and reproduced using two layers at the same time, the time required to be recorded or reproduced can be reduced to half of the conventional time. Accordingly, the recording and reproducing operations of the twelvefold speed can be performed also by using the above-described flexible sheet.

An example where used is one pickup 4 that emits two laser beams arranged in line is described above; further, two or more pickups that each emit one or more laser beams may be used.

FIG. 4 illustrates an example of arrangement of two pickups. In FIG. 4, two pickups 41 and 42 are provided at positions opposing to each other at an angle of 180° and each operate independently.

Figure 5:
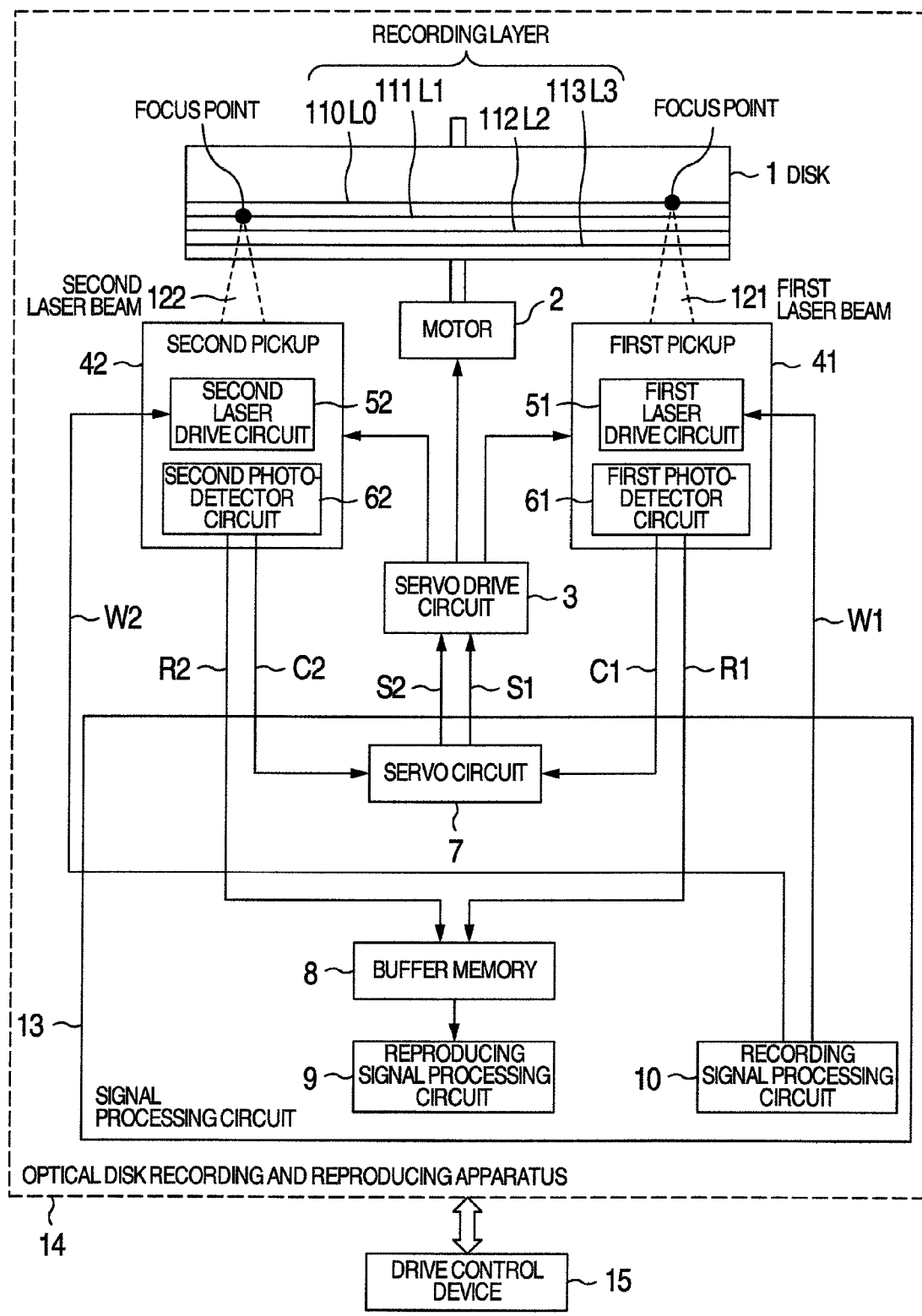
FIG. 5 is a block diagram of a multilayer optical disk recording and reproducing apparatus according to the present invention.

FIG. 5 is a block diagram illustrating one embodiment of a multilayer optical disk recording and reproducing apparatus according to the present invention. In FIG. 5, the same parts as those of FIG. 1 are indicated by the same reference numerals as those of FIG. 1. Reference numeral 41 denotes a first pickup, 42 denotes a second pickup, 51 denotes a first laser drive circuit, 52 denotes a second laser drive circuit, 61 denotes a first photodetector circuit, and 62 denotes a second photodetector circuit.

The first pickup 41 includes the first laser drive circuit 51 and the first photodetector circuit 61, and the second pickup 42 includes the second laser drive circuit 52 and the second photodetector circuit 62, respectively. They are configured so as to be movable independently in the radius direction of the disk 1. Specifically, the focus control and tracking control of the first pickup 41 and the second pickup 42 are each controlled independently by the servo control signal C1 of the first photodetector circuit 61, the servo control signal C2 of the second photodetector circuit 62, and the output signals S1 and S2 of the servo circuit 7.

Since the two independent pickups 41 and 42 are provided, the present embodiment is not limited to a disk radius position between two laser beams as compared with the embodiment shown in FIG. 1. Therefore, as shown in FIG. 5, the simultaneous recording operation can be performed on an arbitrary radius position of two adjacent layers (e.g., the L0 recording layer 110 and the L1 recording layer 111).

An example where the two independent pickups are arranged at positions opposing to each other at an angle of 180° is described above; however, the present invention is not limited thereto and, for example, independent pickups may be arranged at intervals of about 90°. Further, three independent pickups may be arranged at intervals of about 120°.

Figure 6:
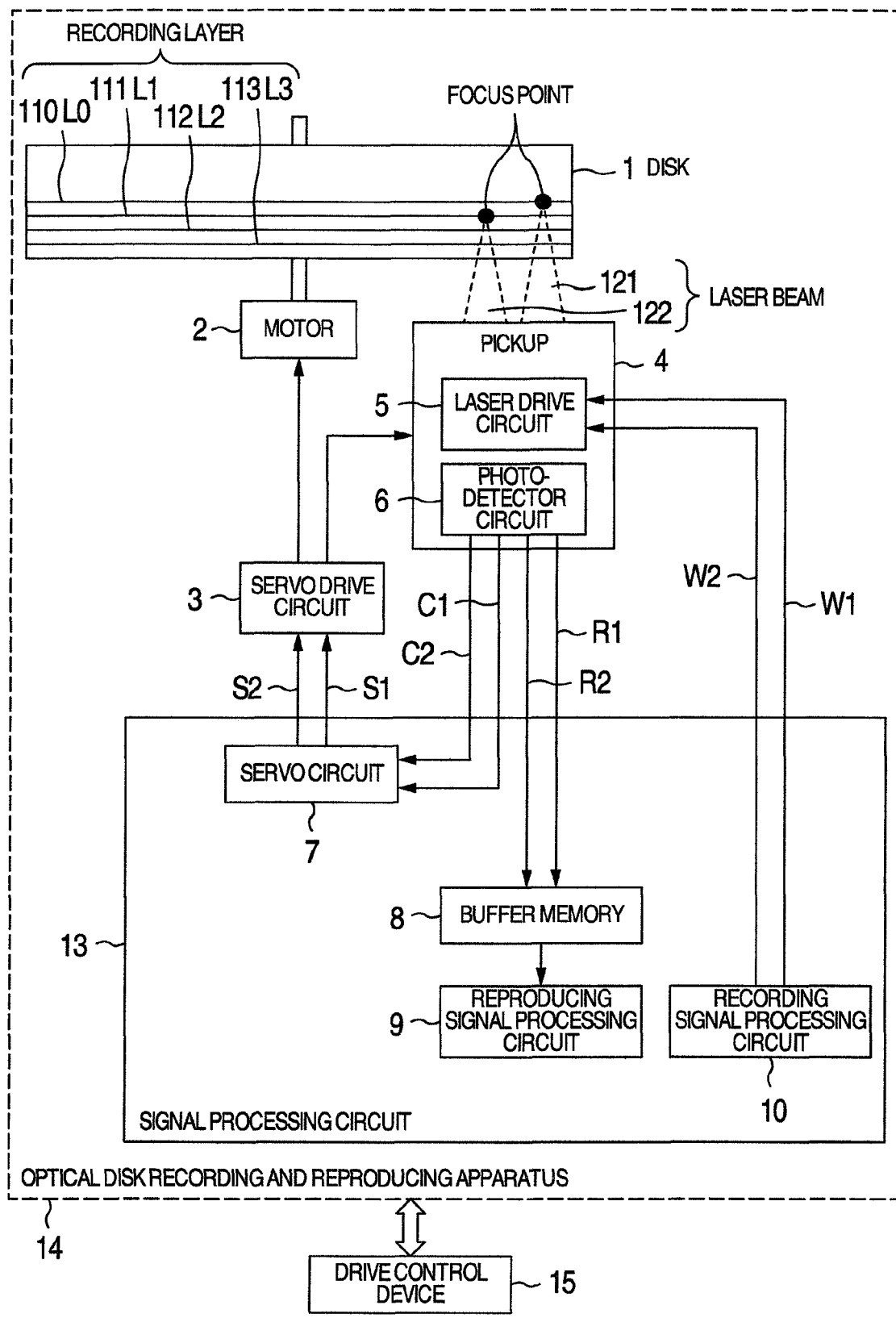
FIG. 6 is a block diagram of a multilayer optical disk recording and reproducing apparatus according to the present invention.

FIG. 6 is a block diagram illustrating one embodiment of a multilayer optical disk recording and reproducing apparatus according to the present invention.

The apparatus 14 according to the embodiment shown in FIG. 1 is configured to irradiate the first laser beam 121 and the second laser beam 122 alternately at the same time. The apparatus 14 according to the present embodiment shown in FIG. 6 is configured to perform a recording operation on two adjacent layers connected to each other at the same time. In FIG. 6, from an inner peripheral surface to an outer peripheral surface of the disk 1, the first laser beam 121 sequentially records information data on a recording track of the L0 recording layer 110, and meanwhile, the second laser beam 122 records information data on a recording track of the L1 recording layer 111. When the recording operation is finished up to the outermost peripheral surface of the disk 1, each laser beam performs an interlayer jump as much as two recording layers and performs a focus adjustment. Then, from an outer peripheral surface to an inner peripheral surface, at this time, the first laser beam 121 records the information data on a recording track of the L2 recording layer 112, and the second laser beam 122 records the information data on a recording track of the L3 recording layer 113.

The recording direction of the L1 recording layer 111 and of the L2 recording layer 112 are opposite as compared with the embodiment shown in FIG. 1; however, the recording/reproducing control is performed using the physical address, and therefore, there is no problem regarding operations.

In the above description, from an outer peripheral surface to an inner peripheral surface, the first laser beam 121 records the information data on a recording track of the L2 recording layer 112, and the second laser beam 122 records the information data on a recording track of the L3 recording layer 113; further, each laser beam may record the information data on a recording track of the recording layer from an inner peripheral surface to an outer peripheral surface.

An example where a four-layer optical disk and two laser beams are used is described above; however, the present invention is not limited thereto. A combination of a six-layer optical disk and two laser beams as well as of a six-layer optical disk and three laser beams may be used. Even if the number of layers and the number of laser beams further increase, the apparatus 14 according to the present invention can accept these combinations. When using the three laser beams, three recording layers can record or reproduce the information data at the same time. Accordingly, the time required to be recorded or reproduced can be reduced to one third of the conventional time, and the speeding up can be further realized as compared with a case of using two laser beams.

Figure 7:
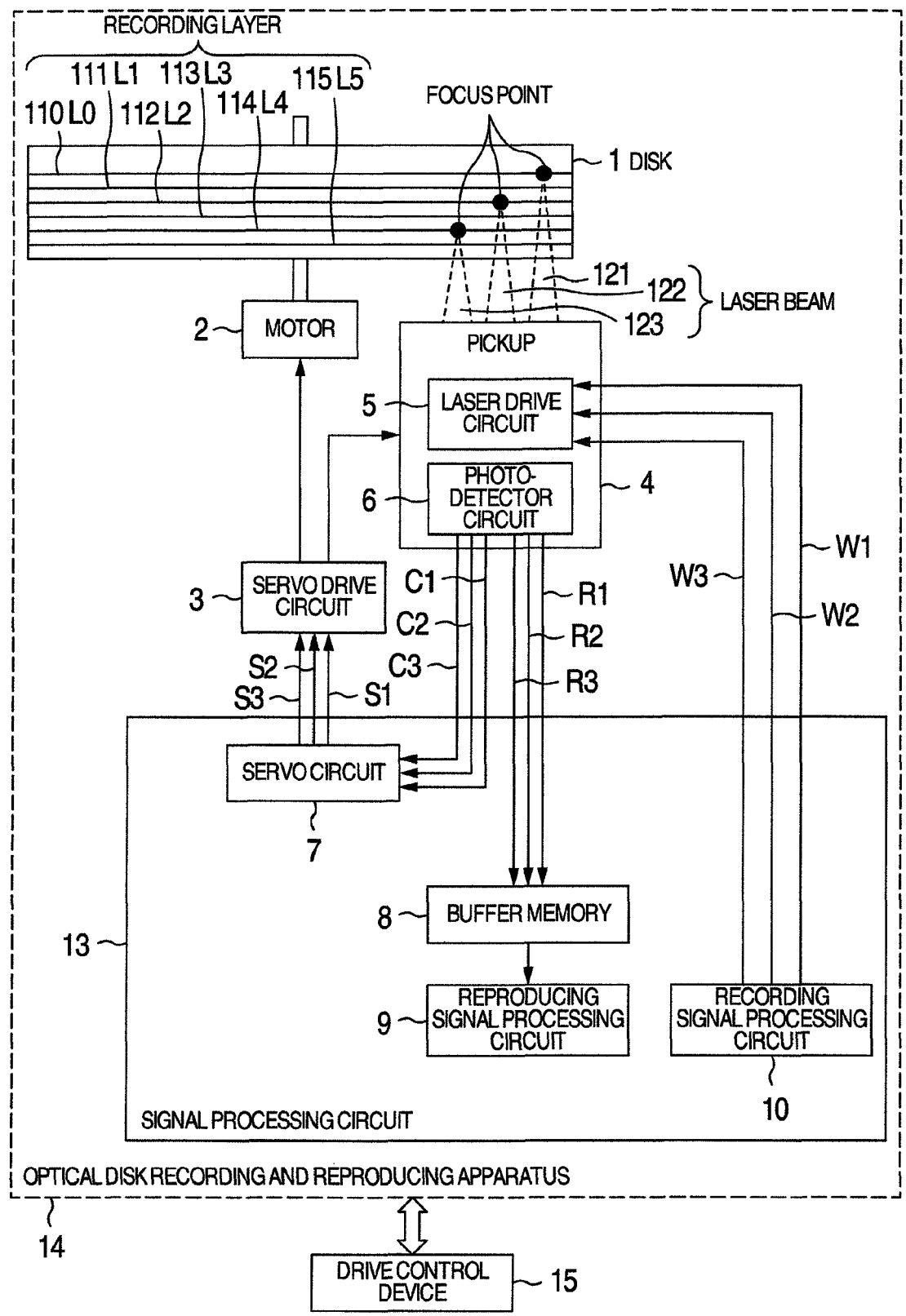
FIG. 7 is a block diagram of a multilayer optical disk recording and reproducing apparatus according to the present invention.

FIG. 7 is a block diagram illustrating another embodiment of the multilayer optical disk recording and reproducing apparatus according to the present invention. In FIG. 7, the same parts as those of FIG. 1 are indicated by the same reference numerals as those of FIG. 1. Reference numeral 114 denotes an L4 recording layer, 115 denotes an L5 recording layer, and 123 denotes a third laser beam. The configuration of FIG. 7 is different from that of FIG. 1 in that a six-layer optical disk and three laser beams are used.

In FIG. 7, when commanding a three-layer simultaneous recording mode, the drive control device 15 causes the recording signal processing circuit 10 to operate at a speed being three times as fast as the conventional speed as well as to output three recording signal data strings W1, W2 and W3 at the same time, and causes the pickup 4 to emit the first laser beam 121, the second laser beam 122, and the third laser beam 123, respectively. Each of the recording signal data strings W1, W2, and W3 at this time has the same data transmission speed as that at the time of the conventional single layer recording operation. In the present embodiment, the servo drive circuit 3 performs a focus control such that the first laser beam 121 focuses on the L0 recording layer 110, the second laser beam 122 focuses on the L2 recording layer 112, and the third laser beam 123 focuses on the L4 recording layer 114.

Next, from the inner peripheral surface to the outer peripheral surface of the disk 1, the first laser beam 121 sequentially records the information data on a recording track of the L0 recording layer 110, the second laser beam 122 records the information data on a recording track of the L2 recording layer 112, and the third laser beam 123 records the information data on a recording track of the L4 recording layer 114. When the recording operation is finished up to the outermost peripheral surface, each laser beam performs an interlayer jump as much as one recording layer and performs a focus adjustment. Then, from the outer peripheral surface to the inner peripheral surface, at this time, the first laser beam 121 records the information data on a recording track of the L1 recording layer 111, the second laser beam 122 records the information data on a recording track of the L3 recording layer 113, and the third laser beam 123 records the information data on a recording track of the L5 recording layer 115.

When the information data is thus recorded using three recording layers at the same time, the time required to be recorded can be reduced to one third of the conventional time.

In the same manner, when the reproducing operation is performed on three recording layers at the same time, the recorded data can be reproduced in one third of the conventional time.

Herein, the focus control and tracking control of the first laser beam 121, the second laser beam 122, and the third laser beam 123 are each controlled independently by the servo control signals C1, C2, and C3 of the photodetector circuit 6 as well as by the output signals S1, S2, and S3 of the servo circuit 7.

An example where the recording operation is performed alternately on three recording layers at the same time is described above; further, the simultaneous recording and reproducing operation may be performed on three recording layers connected to each other as described above. When the disk rotation control is performed by the above-described CAV system, a high-speed access can be performed to recording areas in each layer and between layers.

Second Embodiment

Figure 8:
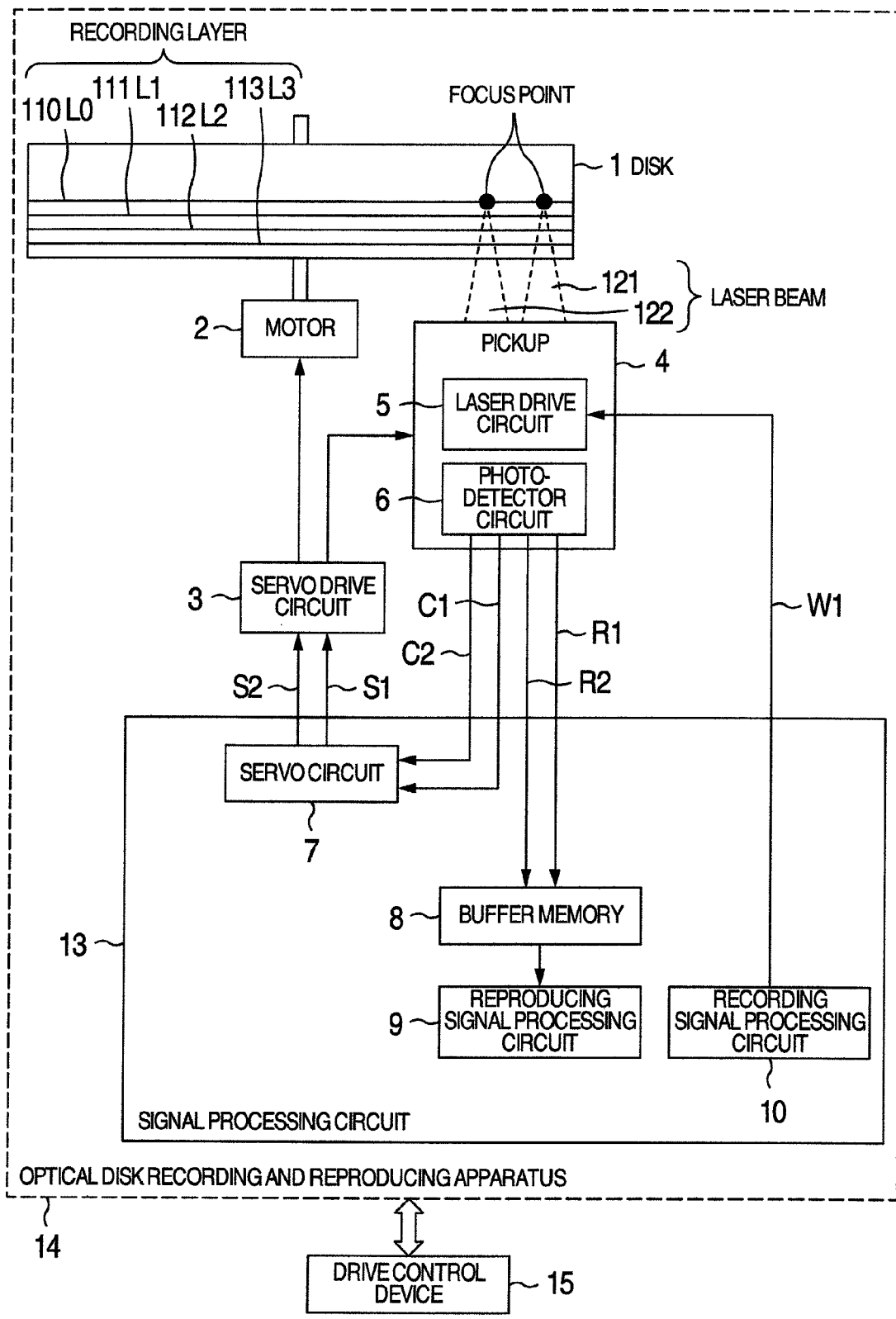
FIG. 8 is a block diagram of a multilayer optical disk recording and reproducing apparatus according to the present invention.

FIG. 8 is a block diagram according to a second embodiment of the present invention.

The optical disk recording and reproducing apparatus 14 shown in FIG. 8 is configured by the same parts as those of FIG. 1. Further, FIG. 8 illustrates an example where the first laser beam 121 is used only for the recording operation, the second laser beam 122 is used only for the reproducing operation and they are used for the recording and reproducing operations to and from the L0 recording layer 110.

In the case of performing the single layer recording operation, the recording operation can be performed using one laser beam in the same manner as in the conventional configuration. In FIG. 8, any one of the first laser beam 121 and the second laser beam 122 is operated, and the recording mode or the reproducing mode may be switched. When using, for example, the first laser beam 121, the operation in the recording mode is performed using the recording signal data string W1 and reproducing signal data string R1 outputted from the recording signal processing circuit 13.

As compared with the above-described conventional method, according to the second embodiment of the present invention, both of the first laser beam 121 and the second laser beam 122 focus on the L0 recording layer 110. By this configuration, immediately after the recording operation is performed on the L0 recording layer 110 using the first laser beam 121, the recorded data is reproduced using the second laser beam 122. Thereby, the recorded data can be continuously checked with the reproduced data (read after write process). In the above-described conventional method, the read after write process is performed such that one laser beam is switched from the recording mode to the reproducing mode immediately after the recording operation and the laser beam is moved, by performing a track-jump operation, up to a starting point of the data recorded immediately before. As a result, the present invention exerts the following effect as compared with the conventional method. That is, since the reproducing operation can be continuously performed using the second laser beam 122 immediately after the recording operation is performed using the first laser beam 121, the read after write process can be performed in half of the conventional time without performing a track-jump operation.

When the data recorded on the single recording layer is reproduced in the present invention, any one of the first laser beam and the second laser beam may be operated. In this case, since non used circuit portion within the signal processing circuit 13 can be turned off, power consumption can be equal to that of the conventional apparatus.

The dual-layer simultaneous recording method and the single layer recording method are described above; further, these methods can be mixedly used according to need of the high-speed recording operation.

Figure 9:
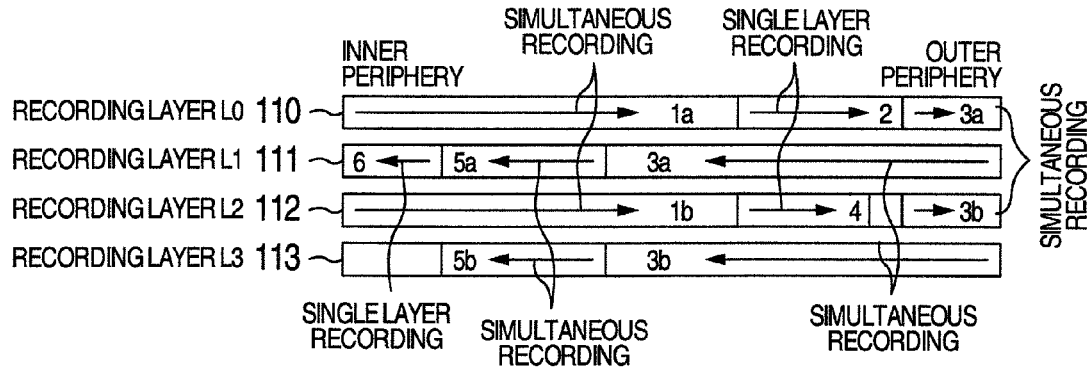
FIG. 9 illustrates one example of a plurality of file recording location according to the present invention.

FIG. 9 illustrates one example of a recording area distribution at the time of recording a plurality of data files on the multilayer optical disk. Each numeral of FIG. 9 represents a recording order of recording files, alphabetical characters a, and b represent that the files are recorded at the same time, and an arrow represents a size of the recording file, respectively.

A file 1, since being in simultaneous recording mode, is recorded on the L0 recording layer 110 and the L2 recording layer 112 (1a, 1b). Next, a file 2, since being in the normal single layer recording mode, is recorded subsequent to a file 1 recording end part (1a) of the L0 recording layer 110 (2). A file 3, since being in the simultaneous recording mode, is recorded subsequent to the file 2 recording end part (2) of the L0 recording layer 110 and to the same physical address of the L2 recording layer 112 as that of the L0 recording layer 110. In this case, since a size of the file 3 is large, a jump operation of one recording layer is each performed at the time of finishing the recording operation of the L0 recording layer 110 and the L2 recording layer 112, and subsequently, the recording operation is performed on the L1 recording layer 111 and the L3 recording layer 113 (3a, 3b). Next, a file 4, since being in the normal single layer recording mode, is recorded subsequent to a file 1 recording end part (1b) of the L2 recording layer 112 (4). A file 5, since being in the simultaneous recording mode, is recorded subsequent to a file 3 recording end part (3a) of the L1 recording layer 111 and to a file 3 recording end part (3b) of the L3 recording layer 113 (5a, 5b). Finally, a file 6, since being in the normal single layer recording mode, is recorded subsequent to a file 5 recording end part (5a) of the L1 recording layer 111 (6).

In the case of performing the dual-layer simultaneous recording operation as described above, the control is performed so as to start the recording operation from the same physical address of each recording layer. This facilitates management of the physical addresses even if the single layer recording format mixedly exists.

Since the deepest L0 recording layer 110 has the same depth as that of existing BD-R, the file 2 shown in FIG. 9 can be here reproduced using a conventional Blu-ray disk reproducing apparatus. For this purpose, in the multilayer optical disk recording and reproducing apparatus according to the present invention, the L0 recording layer 110 is set so as to be selected to record information data desired to be reproduced using a conventional disk reproducing apparatus.

A normal file data recording operation is described above; further, even if the recording data is image information, the present invention is applicable to the recording data. As high-definition broadcast becomes more widely used, the image information is required to be transmitted with higher speed and in larger capacity. Also, the recorder for recording the information is required to be high-quality and high-speed. For this purpose, an image compression rate is required to be reduced as much as possible so as to record vast information data on time. For the above-described request, two recording layers can be recorded at the same time according to the present invention. Therefore, for a high-capacity data such as high-definition image information, the recording data is divided into halves by two layers, thereby performing the high-speed recording operation. The present invention exerts an effect that with regard to the reproducing operation, since vast information data can be reproduced on two layers at the same time, higher-quality image signals are obtained. Further, the present invention can be applied not only to a write once disk and a rewritable disk but also to a disk exclusive for reproduction such as a ROM.

Further, as described above, when the simultaneous recording operation is performed on the deepest L0 recording layer 110 and the L2 recording layer 112, the reproducing operation is performed on the L0 recording layer 110 using the conventional disk reproducing apparatus, thereby reproducing an image equivalent to the standard image.

Third Embodiment

Figure 10:
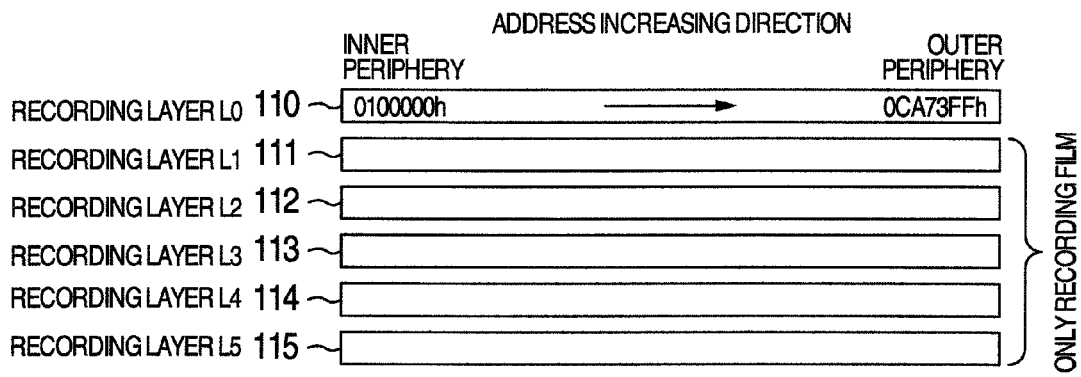
FIG. 10 illustrates one example of a configuration of a multilayer optical disk according to the present invention.

FIG. 10 illustrates one example of the multilayer optical disk according to the present invention. FIG. 10 illustrates a multi-laser beam corresponding multilayer optical disk. The multilayer optical disk is configured such that the recording track guide groove and physical address are formed in the L0 recording layer 110, and the L1 to L5 recording layers each have only a recording film.

The pickup emits two or more laser beams as described above. Thereby, the pickup 4 focuses, for example, the first laser beam 121 on the L0 recording layer 110, and the servo drive circuit 3 performs a tracking control and recording address control. Further, the pickup 4 focuses the second laser beam 122 on another recording layer, for example, on the L1 recording layer 111 and performs the recording and reproducing operations. At this time, the servo circuit 7 controls the servo drive circuit 3 to perform the tracking control of the second laser beam 122 while following that of the first laser beam 121.

According to the above-described configuration, in each of the L1 to L5 recording layers, the recording track guide groove is not required and only the recording film may be formed. Since the management of bonding position accuracy of each recording layer is not required, disk costs can be largely reduced.

FIG. 10 illustrates an example where the recording track guide groove and physical addresses are formed in the L0 recording layer 110. In addition to the L5 recording layer 115 near a surface of the disk 1, the recording track guide groove and physical addresses may be formed in any one of the other recording layers.

Figure 11:
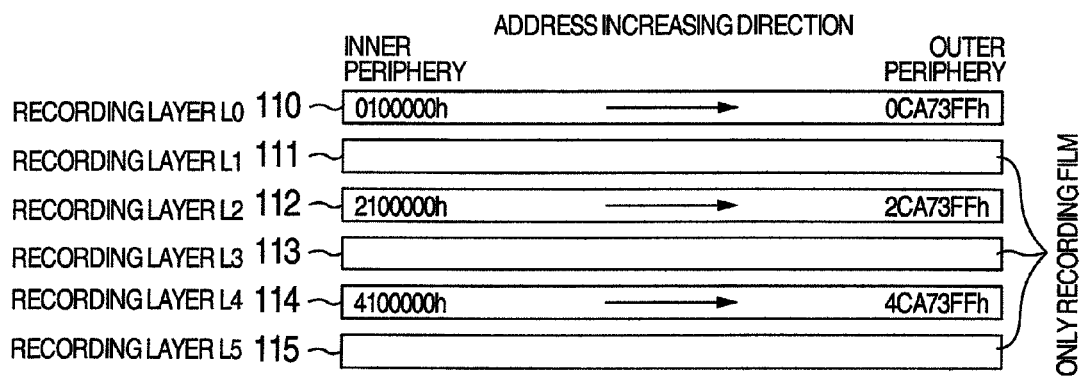
FIG. 11 illustrates one example of a configuration of a multilayer optical disk according to the present invention.

FIG. 11 illustrates one example of another multilayer optical disk according to the present invention. The multilayer optical disk shown in FIG. 11 is configured such that the recording track guide groove and physical addresses are formed in the L0 recording layer 110, the L2 recording layer 112, and the L4 recording layer 114, and the L1 recording layer 111, the L3 recording layer 113, and the L5 recording layer 115 each have only the recording film.

In the multilayer optical disk shown in FIG. 10, the tracking control of the first laser beam 121 is used for that of the second laser beam 122 at the same time. Therefore, if once the simultaneous recording operation is performed on the L0 recording layer 110 having the recording track guide groove and another recording layer, only the single layer recording operation can be performed next time and at subsequent times. The present invention exerts the following effect as compared with the multilayer optical disk shown in FIG. 10. That is, the multilayer optical disk shown in FIG. 11 alternately has the recording layers with the recording track guide groove, and therefore, the dual-layer simultaneous recording operation can be always performed.

Preferred embodiments of the multilayer optical disk recording and reproducing apparatus according to the present invention are described above. However, the present invention is not limited to the above embodiments and combinations of the above embodiments, various modifications and enhancements may be made without departing from the spirit and scope of the invention.

Details of the present invention are described using the Blu-ray disk device as an example. However, the present invention is not limited to the Blu-ray disk device, and applicable also to DVD devices and CD devices.

The invention claimed is:

1. A multilayer optical disk recording apparatus for recording information on a multilayer optical disk having a plurality of recording layers in a thick direction, comprising an optical pickup that emits N (N represents an integer of two or more) laser beams of the same wavelength, the apparatus causing the optical pickup:
   to emit the N laser beams at the same time,
   to focus the N laser beams on a first recording layer group alternately configured by N recording layers of the multilayer optical disk, and
   to perform a recording operation on the N recording layers at the same time; and
   when changing the recording layers,
     to focus the N laser beams on a second recording layer group configured by recording layers adjacent to the respective recording layers configuring the first recording layer group, and
     to perform a recording operation on the N recording layers at the same time.

2. The multilayer optical disk recording apparatus according to claim 1, wherein:
the optical pickup can irradiate the N laser beams in line in a track direction of the multilayer optical disk.

3. The multilayer optical disk recording apparatus according to claim 1, wherein:
in the multilayer optical disk, when the plurality of recording layers that are arranged in a sequential order in the thick direction of the multilayer optical disk are each set to a zero-th recording layer, a first recording layer, a second recording layer, . . . , an m-th recording layer (m represents an integer of one or more), physical address data is continuously allocated in regular order from the zero-th recording layer to the m-th recording layer, and at the same time, in a sequential order in even-numbered recording layers and in a sequential order in odd-numbered recording layers, and information corresponding to a layer number of each recording layer is imparted to the physical address data of each recording layer.

4. The multilayer optical disk recording apparatus according to claim 1, wherein:
when an error is detected in recording data on any one of recording layers by a read after write process and a defect management of the recording data is performed, change information data is recorded on a disk management area of the recording layer and a disk management area of the other recording layers during a simultaneous recording operation.

5. The multilayer optical disk recording apparatus according to claim 1, wherein:
when performing a recording operation on only one recording layer, data is recorded on the recording layer using an upstream laser beam with regard to a disk rotation direction, a downstream laser beam is set to reproducing power and is focused on the same recording layer as that of the upstream laser beam, and the data recorded by the upstream laser beam is reproduced to detect an error of the recorded data.

6. The multilayer optical disk recording apparatus according to claim 1, wherein:
when data reproduced using an apparatus that can reproduce only a single-layer or dual-layer optical disk is recorded on the multilayer optical disk, the data is recorded on a deepest recording layer of the multilayer optical disk.

7. The multilayer optical disk recording apparatus according to claim 1, further comprising a servo drive circuit and a servo circuit that controls tracking and focusing for the N laser Beams on N recording layers, wherein:
the servo drive circuit and the servo circuit performs a focusing operation and a tracking operation of each of the N laser beams on N recording layers independently.

8. The multilayer optical disk recording apparatus according to claim 1, further comprising a recording signal processing circuit that generates a N recording digital signal trains and a laser drive circuit that emits the N laser beams, wherein:
the apparatus causing the recording signal processing circuit to:
operate at an operating speed being N-fold as fast as a predetermined data transmission speed; and
transmit the N recording digital signal trains to the laser drive circuit with the predetermined data transmission rate simultaneously; and
the apparatus causing the laser drive circuit to:
perform a emitting operation of the N laser beams; and
perform a recording operation on N recording layers simultaneously.

9. A multilayer optical disk reproducing apparatus for reproducing information recorded on a multilayer optical disk having a plurality of recording layers in a thick direction, comprising an optical pickup that emits N (N represents an integer of two or more) laser beams of the same wavelength, the apparatus causing the optical pickup:
to emit the N laser beams at the same time,
to focus the N laser beams on a first recording layer group alternately configured by N recording layers of the multilayer optical disk, and
to perform a reproducing operation on recording layers of the first recording layer group; and
when changing the recording layers,
to focus the N laser beams on a second recording layer group configured by recording layers adjacent to the respective recording layers configuring the first recording layer group, and
to perform a reproducing operation on the N recording layers at the same time.

10. The multilayer optical disk reproducing apparatus according to claim 9, wherein:
the optical pickup can irradiate the N laser beams in line in a track direction of the multilayer optical disk.

11. The multilayer optical disk reproducing apparatus according to claim 9, wherein:
in the multilayer optical disk, when the plurality of recording layers that are arranged in a sequential order in the thick direction of the multilayer optical disk are each set to a zero-th recording layer, a first recording layer, a second recording layer, . . . , an m-th recording layer (m represents an integer of one or more), physical address data is continuously allocated in regular order from the zero-th recording layer to the m-th recording layer, and at the same time, in a sequential order in even-numbered recording layers and in a sequential order in odd-numbered recording layers, and information corresponding to a layer number of each recording layer is imparted to the physical address data of each recording layer.

12. The multilayer optical disk reproducing apparatus according to claim 9, further comprising a servo drive circuit and a servo circuit that control tracking and focusing for N laser beams on N recording layers, wherein:
the servo drive circuit and the servo circuit perform a focusing operation and a tracking operation of each of the N laser beams on N recording layers independently.

13. The multilayer optical disk reproducing apparatus according to claim 9, further comprising a laser drive circuit that emits the N laser beams, a photo detector circuit that detects a N reproduced data trains, buffer memory that stores the N reproduced data trains, and reproducing signal processing circuit, wherein:
the apparatus causing the laser drive circuit to perform a emitting operation of the N laser beams on N recording layers with reproducing laser power, and
the apparatus causing the photo detector circuit to:
perform a detecting operation of the N laser beams on N recording layers simultaneously, and
store N reproduced data trains to buffer memory; and
the apparatus causing the reproducing signal processing circuit to:
read out the reproduced data from the buffer memory with approximate N-fold data transmission rate as compared with writing rate of one reproduced data train by the photo detector circuit; and
perform a reproducing signal processing operation.

* * * * *